Aug. 11, 1925.
R. M. DECKER
1,549,460
LOCKING MECHANISM FOR MOTOR CARS
Filed April 28, 1922
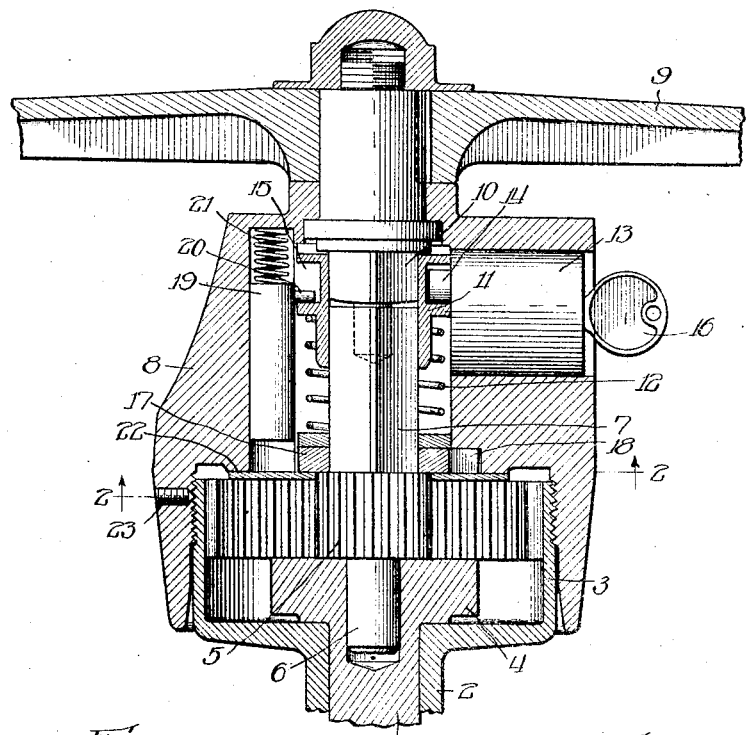
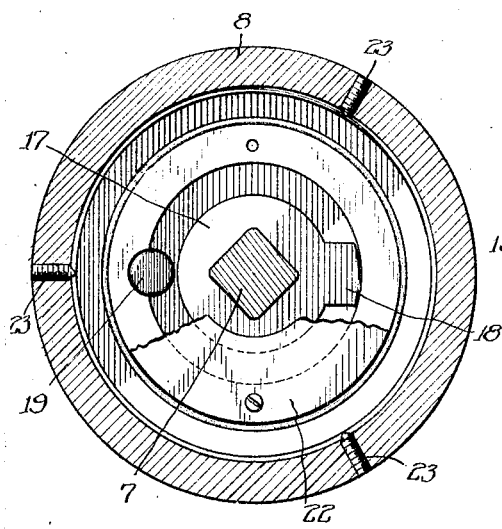
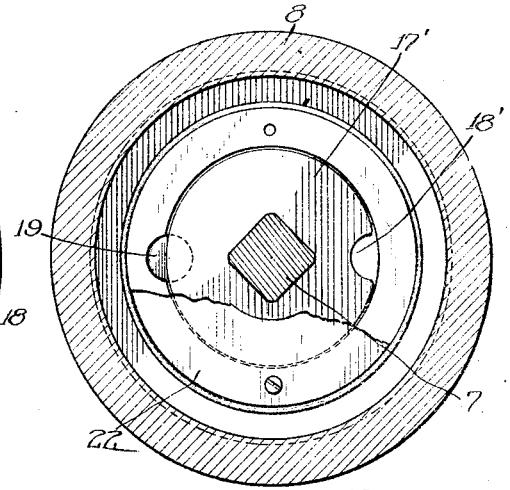
Witness:
R. Burkhardt
Inventor:
Richard M. Decker,
By Wilkinson, Huxley,
Byron & Knight.
Attys Patented Aug. 11, 1925.

1,549,460

UNITED STATES PATENT OFFICE.

RICHARD M. DECKER, OF CHICAGO, ILLINOIS, ASSIGNOR TO RICHARD M. DECKER COMPANY, A COPARTNERSHIP CONSISTING OF RICHARD M. DECKER, F. B. HARRIMAN, M. H. DECKER, S. P. HARRIMAN, AND L. M. HARRIMAN.

LOCKING MECHANISM FOR MOTOR CARS.

Application filed April 28, 1922. Serial No. 557,122.

*To all whom it may concern:*

Be it known that I, RICHARD M. DECKER, a citizen of the United States, residing at Chicago, in the county of Cook and State of Illinois, have invented certain new and useful Improvements in Locking Mechanism for Motor Cars, of which the following is a specification.

The present invention relates to locking mechanism for motor cars.

Various expedients have been evolved and are now in use for locking a car by interrupting the driving relation between the steering wheel and the remainder of the mechanism. The preseint invention relates to this type of steering mechanism and has for one of its objects the provision of a construction which will baffle thieves to a greater extent than some of the devices with which applicant is familiar.

A further object is to provide mechanism of the kind referred to which is simple in construction, cheap to manufacture and which avoids certain defects common in some locking devices, by reason of which defects thieves are able to nullify the effects of the locking mechanism.

A further object is to provide a locking mechanism which is simple to install upon cars which are already built and in service and which will effectually baffle thieves.

Further objects will appear as the description proceeds.

Referring to drawings—
Figure 1 is a sectional view taken along the longitudinal axis of the steering mechanism of a motor car and illustrates one embodiment of the present invention;

Figure 2 is a sectional view taken along the plane of the line 2—2 of Figure 1; and Figure 3 represents a modification.

The invention is illustrated in connection with a motor car of the Ford type and solves problems which are peculiar to this kind of motor car.

The numeral 1 indicates the steering rod of a motor car of the Ford type, which steering rod is encased within the steering column 2. The steering column 2 is shaped at its upper end to provide a cup 3, which is externally screw-threaded and which is provided with an internal gear at its upper portion. The steering rod 1 is provided at its upper end with a spider 4 which carries pivot pins extending parallel to the longitudinal axis of the steering rod, which pivot pins provide bearing for planetary gears (not shown), which planetary gears engage with the internal gear on cup 3 and also engage with a sun gear. All of the above mentioned construction is common in cars of the Ford type, steering motion being communicated to the sun gear and transmitted therefrom to the planetary gears, which, by reason of their engagement with the internal gear of the cup 3, transmit steering motion to the spider 4 and steering rod 1.

According to the present invention, a sun gear 5 is provided, having on one side the circular pin 6 adapted to lie within a corresponding recess in spider 4, and provided on its upper side with a stud 7, which should be non-circular in cross section.

Mounted in screw-threaded engagement with the cup 3 is the cap 8, which may be of hardened steel or other tool resisting material. Said cup 3 and cap 8 therefore constitute a two-part stationary housing. Said cap 8 supports and provides journal means for the steering wheel 9, which steering wheel may be mounted upon a stub shaft 10 having a lower portion of non-circular cross section corresponding to the dimensions of stud 7. Mounted in a position to engage the stub shaft 10 and the stud 7 is the coupling element 11, which is provided with a hole conforming to the cross sectional dimensions of said stub shaft 10 and stud 7. When said coupling element 11 is in its uppermost position, as illustrated in Figure 1, said coupling element will cause stub shaft 10 and stud 7 to rotate as a unit, whereby steering motion from steering wheel 9 is communicated to the sun gear 5, thence to the steering rod 1. A spring 12 is provided for normally holding the coupling element 11 in its uppermost position, that is, its operative position. Mounted in the cap 8 is the lock cylinder 13 having the eccentrically mounted stud 14 adapted to ride in a circumferential groove 15 of the coupling element 11. A key 16 is provided for lock cylinder 13, rotation of which in one direction will cause movement of the coupling element 11 to its lowermost position, in which position the stub shaft 10 is disconnected from stud 7. Turning of the key 16 through a small angle will allow the spring 12 to move the coupling element to its uppermost position and a slight turning of the steering wheel 9 will allow the coupling element 11 to find its position in coupling relation with stub shaft 10.

Rigidly mounted with respect to the sun gear 5 and stud 7 is the collar 17, which may be provided with the lug 18, which extends from said collar 17 in a radial direction. Mounted within the cap 8 in a position to have a reciprocatory movement in a line parallel to the line of movement of the coupling element 11 is the bolt 19, which may be spring-pressed downwardly. Said bolt has an outstanding lug 20 adapted to engage with the coupling element 11, whereby upward movement of the coupling element 11 will result in upward movement of the bolt 19. The bolt 19 is urged downwardly by means of the spring 21, the effect of which spring should be less than that of spring 12, whereby the normal tendency of the parts will be to hold the coupling element 11 in coupling relation with the stub shaft 10 and stud 7, and to hold the bolt 19 in its uppermost position. Said bolt 19 is so placed that when it is in its lowermost position it will provide an abutment for the outstanding lug 18 of the collar 17, which collar is fast to the sun gear 5. A plate 22 may be provided for limiting the downward movement of bolt 19. Screws 23—23 may be provided extending laterally through the side wall of cap 8 and impinging against the external screw-threads of cup 3.

A device according to the present invention may be readily applied to cars of the Ford type which are now in service, it being only necessary to remove the screw-threaded cover on the cup-shaped portion which houses the planetary gears, replacing said cover with the cap 8 and replacing the sun gear of a car of the Ford type with the sun gear 5. When the user desires to leave his car in a condition to baffle thieves, he will operate the key 16 to cause the eccentrically mounted stud 14 to move the coupling element 11 downwardly against the tension of spring 12, thereby uncoupling the stub shaft 10 from the stud 7. This movement will permit spring 21 to move the bolt 19 downwardly, whereby said bolt 19 will constitute an abutment for the outstanding lug 18 of the collar 17. At this time the steering wheel 9 may spin freely without communicating any steering motion to the steering mechanism of the car. Furthermore, the bolt 19, by reason of its abutting relation with lug 28 which is rigid with the sun gear 5, will prevent the removal of cap 8 from the cup 3.

By reason of the structure illustrated, in which the outstanding lug 18 constitutes only a small portion of the circumference of the circle in which it travels, the cap 8, even if same were turned by the application of a considerable force, could have no material effect in communicating steering motion to the sun gear 5. Certain locking devices which have been devised are objectionable for the reason that a thief, by applying a Stillson or other wrench to the cover of the cup-shaped portion of the steering mechanism of a Ford car, can sheer off the flimsy cover locking devices ordinarily provided, and, if the cover is not turned down to the limit on said cup, can communicate a steering motion to the sun gear, thereby driving the car. The extent to which the steering wheel of a Ford can be turned for effective steering movement is limited. The extent to which the cover of the cup 3 may be turned for communicating effective steering motion to the sun gear is correspondingly limited. According to the construction illustrated in Figures 1 and 2, therefore, wherein a great amount of lost motion is allowed between lug 18 and bolt 19, the possibilities of steering by applying force to the cap 8 are reduced to a minimum, inasmuch as a considerable degree of angular travel in either direction must be made before the bolt 19 would become effective against lug 18. For all practical purposes, therefore, a car of the Ford type equipped with the locking mechanism disclosed in Figures 1 and 2 is unsteerable by any such expedient.

Instead of providing the collar 17 with the outstanding lug 18, a collar 17' may be provided rigid with the sun gear 5 and stud 7, said collar 17' being provided with a notch 18' adapted to receive the bolt 19. According to the construction illustrated in Figure 3, however, if the car were left in a condition wherein the driving relation between the steering wheel 9 and sun gear 5 is interrupted, that is to say, in a condition in which the coupling element 11 is in its lowermost position, whereby the spring 21 may move the bolt 19 downwardly, engagement of bolt 19 against the sides of notch 18' will interfere with turning movement of cap 8 and prevent the removal thereof, though the construction would not prevent the communication of steering motion to the stud 7 and sun gear 5 by the application of a considerable force to cap 8. The construction illustrated in Figure 3, therefore, does not present all the advantages of the structure illustrated in Figures 1 and 2. The screws 23—23, which may be readily removed from the outside of the cap 8, will serve to prevent the cap 8 from accidental turning relative to the cup 3.

One embodiment of the present invention has been described in detail. Many modifications will occur to those skilled in the art. It is intended in this patent to cover

I claim:

1. In combination, a steering column having an enlarged portion, planetary gearing within said enlarged portion, said planetary gearing including a sun gear, a cover for said enlarged portion and constituting therewith a housing, a steering wheel, coupling means within said housing for governing the operative connection between said steering wheel and said sun gear, stop means responsive to said coupling means, and abutment means rigid with said sun gear for cooperating with said stop means to prevent the removal of said cover from said enlarged portion, said abutment means including a radial lug occupying only a small portion of the circumference of the circle in which it travels.

2. In combination, a steering column having an enlarged portion, a cover therefor constituting therewith a housing, steering mechanism within said steering column, a steering wheel, coupling means within said housing for governing the connection between said steering wheel and said steering mechanism, said steering mechanism including planetary gearing having a sun gear and a radial lug rigid with said sun gear, said lug occupying only a small part of the circumference of the circle in which it travels, and bolt means responsive to said coupling means and adapted to abut against said lug.

3. In combination, a two-part housing, planetary gearing including a sun gear mounted within said housing, a steering wheel shaft extending into said housing, coupling means for governing the connection between the steering wheel shaft and sun gear and stop means responsive to said coupling means, and abutment means rigid with said sun gear adapted to cooperate with said stop means to limit movement of one part of said housing relative to the other part thereof, said abutment means comprising an outstanding lug occupying only a small portion of the circumference of its circle of travel.

4. Locking mechanism for steering wheels comprising planetary gearing including a sun gear, a steering wheel, reciprocable means for governing the connection between said steering wheel and said sun gear, housing means for said reciprocable means, stop means responsive to the reciprocable means, and abutment means adapted to cooperate with said stop means, said abutment means being rigid with said sun gear and having a large amount of lost motion relative to said stop means.

5. In combination, a steering column having an enlarged portion, planetary gearing within said enlarged portion, said planetary gearing including a sun gear, a cover for said enlarged portion and constituting therewith a housing, a steering wheel, coupling means within said housing for governing the operative connection between said steering wheel and said sun gear, stop means responsive to said coupling means, and abutment means rigid with said sun gear for cooperating with said stop means to prevent the removal of said cover from said enlarged portion, said abutment means having a relatively large amount of lost motion relative to said stop means.

6. In combination, a steering column having an enlarged portion, a cover therefor constituting therewith a housing, steering mechanism within said steering column, a steering wheel, coupling means within said housing for governing the connection between said steering wheel and said steering mechanism, said steering mechanism including planetary gearing having a sun gear and abutment means rigid with said sun gear, and bolt means responsive to said coupling means and adapted to abut against said abutment means, a large amount of lost motion being provided between said bolt means and said abutment means.

7. In mechanism of the class described, a two-part stationary housing, steering shafts extending into said housing, a hand wheel on one of said shafts, planetary gearing, including a sun gear, within said housing operatively connected with the other of said shafts, coupling mechanism for governing the connection of said first mentioned shaft with said sun gear, said sun gear having an abutting member rigid therewith, stop means responsive to said coupling means and adapted to have abutting relation with said abutting member, a large amount of lost motion being provided between said abutting member and said stop means.

8. In combination, a two-part housing, planetary gearing including a sun gear mounted within said housing, a steering wheel shaft extending into said housing, coupling means for governing the connection between the steering wheel and said sun gear, stop means responsive to said coupling means, and abutment means rigid with said sun gear adapted to cooperate with said stop means to limit movement of one part of said housing relative to the other part thereof, said stop means having a large amount of lost motion relative to said abutment means.

Signed at Chicago, Illinois, this 25th day of April, 1922.

RICHARD M. DECKER.